United States Patent [19]
Bird et al.

[11] Patent Number: 5,325,297
[45] Date of Patent: Jun. 28, 1994

[54] COMPUTER IMPLEMENTED METHOD AND SYSTEM FOR STORING AND RETRIEVING TEXTUAL DATA AND COMPRESSED IMAGE DATA

[75] Inventors: Susan W. Bird, New York; Gilbert J. Veconi, Jr., Brooklyn, both of N.Y.

[73] Assignee: System of Multiple-Colored Images for Internationally Listed Estates, Inc., New York, N.Y.

[21] Appl. No.: 904,173

[22] Filed: Jun. 25, 1992

[51] Int. Cl.$^5$ .......................................... G06F 15/38
[52] U.S. Cl. ................................ 364/419.07; 395/144
[58] Field of Search ...................... 364/419, 513, 518; 395/144, 145, 146

[56] References Cited

U.S. PATENT DOCUMENTS 5,159,667 10/1992 Borrey et al. .................. 395/148
5,179,651 1/1993 Taaffe et al. .................... 395/154

FOREIGN PATENT DOCUMENTS 9109368 6/1991 PCT Int'l Appl. .

OTHER PUBLICATIONS

House-Hunting by Interactive Computer, The New York Times Sunday, Nov. 22, 1992, Section 10, p. 1 and p. 6.
A Special Background Report on Trends in Industry and Finance, The Wall Street Journal, Thursday, Sep., 19, 1991, p. A1.
Evan I. Schwartz, The Kiosks Are Coming, The Kiosks Are Coming, Business Week, Jun. 22, 1992, p. 122.
Richard Korman, Real Estate Listings Enter Computer Age, Crain'S New York Business, Mar. 9, 1992, p. 25.
Mark Alpert, CD-Rom: The Next PC Revolution, Fortune, Jun. 29, 1992, pp. 68–73.
Connie Guglielmo, MPEG Standard Aims to Squeeze Digital Video Into Mainstream, MacWeek, Dec. 3, 1991, pp. 30 and 32.
Marianne Arneberg, Apple Looks to Next Generation, Beefed-Up PowerBooks, PC with CD ROM Expected in Fall, PC Week, Jun. 15, 1992, p. 6.
John Rizzo, Virtus WalkThrough, MacUser, Jul. 1991, pp. 72, 74 and 76.
Datalogics Typesetting Library (DTL), The Seybold Report on Publishing Systems, Feb. 29, 1992, pp. 24 and 25.
Pamphlet pertaining to HomeView, received by applicants during visit on or about Dec. 18, 1991.
Advertisement for Panasonic Still Image Video, Computer Graphics World, Dec. 1990, p. 7.
Andrew Pollack, Video-Image Advances by Apple and Microsoft, New York Times, Monday, Jun. 3, 1991, p. D5.
Rachel Powell, Digitizing TV Into Obsolescence, New York Times, Sunday, Oct. 20, 1991, Section 3, p. 11.
Gina Kolata, New Technique Stores Images More Efficiently, New York Times, Nov. 12, 1991, pp. C1 and C12.
Kodak Hedges With a Hybrid, New York Times, Apr. 28, 1991, Section 3, p. 1.
Peter H. Lewis, Reports With Sound Effects and Video, New York Times, Sunday, Jan. 12, 1992, Section 3, p. 8.

(List continued on next page.)

Primary Examiner—Roy N. Envall, Jr.
Assistant Examiner—Khai Tran
Attorney, Agent, or Firm—White & Case

[57] ABSTRACT

A computer implemented method and system for storing and retrieving data representing textual information, and compressed data representing images. Images are scanned into the system, compressed and stored as compressed image data and related textual information is entered into the system and stored separate and apart from the compressed image data. The stored compressed image data and the related textual data which satisfy particular ranges and values for predetermined search criteria represented in the textual data are made available in the form of pictorial representations and textual information, respectively, for viewing on a computer display monitor means.

35 Claims, 3 Drawing Sheets

OTHER PUBLICATIONS

John Markoff, Adobe Tackles the Paper Glut With a Software For All Systems, New York Times, Dec. 22, 1991, Sect. 3, p. 9.

John Schwartz, At Last: Signs of Life at NeXT, Newsweek, Nov. 18, 1991.

Raines Cohen, Strategic Mapping Plots QuickTime, System 7 Capabilities Into Atlass Pro, MacWeek, Jan. 13, 1992, p. 8.

Apple Reports More than 100 New Quicktime, Executive News Service, OTC 01/13 0855, Jan. 13, (1992) PR Newswire.

Storm Technology Accelerates Quicktime JPEG, Executive News Service, OTC 01/13 0836, Jan. 13 (1992) Business Wire.

Advertisement for Toshiba T6400 Display, Business Week, Feb. 17, 1992, pp. 61-63.

John R. Wilki, Looking for a House On a Computer Screen, The Wall Street Journal, Mar. 22, 1991, p. B1.

The Home-Shopping Network, CIO, Mar. 1992, p. 18.

'Three Bedrooms, River View? I'll Punch That Right Up', Business Week, Jan. 20, 1992, p. 86.

Advertisement for HomeView TM Realty Search Services, The Boston Sunday Globe, May 31, 1992, p. A7.

Advertisement for Home Finder (HomeView), Popular Science, May 1992, p. 16.

Advertisement for Toshiba T6400 display, 1992.

J. Jane Lehman, Multiple-Listing Services Challenged, The Washington Post, Jan. 19, 1991, pp. F1 and F7.

Advertisement for Home-Link, The New York Times magazine, Jan. 12, 1992, p. 43.

Michael Selz, In Real Estate, Big Beats Small in Many Cases, The Wall Street Journal, Feb. 13, 1990, pp. B1 and B3.

Leslie Cauley, Banking on Space Manager, Maryland Business Weekly, Baltimore Sun, Feb. 3, 1992, pp. 8-9.

RTC Establishes National Data Base of Properties for Sale, Empire State Realtor, Jun. 1991, p. 14.

There's No Place Like Home, pp. 106-107 (Applicants are not presently aware of the date or source of this article).

A folder from PRC Realty Systems, Inc., concerning its Stellar-Vision, from May 14, 1992, NAR Trade Show in Washington, D.C.

A brochure from Integrated Marketing Systems, Inc. concerning its Real Smart ® Series from either Nov. 1991 or May 1992 NAR Trade Show in Las Vegas or Washington, D.C., respectively.

A brochure from ReMax ® Realtors ® concerning its Home Photo Network from either Nov. 1991 or May 1992 NAR Trade Show in Las Vegas or Washington, D.C., respectively.

A brochure and two attachments from AT&T concerning its DigitalRealty Imaging Systems from either Nov. 1991 or May 1992 NAR Trade Show in Las Vegas or Washington, D.C., respectively.

A brochure from Value Added Software concerning its RealView TM from either Nov. 1991 or May 1992 NAR Trade Show in Las Vegas or Washington, D.C., respectively.

A brochure from MicroKey concerning its MLI Real-T and Homebase from either Nov. 1991 or May 1992 NAR Trade Show in Las Vegas or Washington, D.C., respectively.

A brochure from Hillside Software USA, Inc. concerning its MLS PcPictures system from either Nov. 1991 or May 1992 NAR Trade Show in Las Vegas or Washington, D.C., respectively.

A brochure from Photo Database Systems, Inc. concerning its Multi-Vision from either Nov. 1991 or May 1992 NAR Trade Show in Las Vegas or Washington, D.C., respectively.

A pamphlet from TASC concerning its MLSplus system from either Nov. 1991 or May 1992 NAR Trade Show in Las Vegas or Washington, D.C., respectively.

A brochure pertaining to Day One TM from either Nov. 1991 or May 1992 NAR Trade Show in Las Vegas or Washington, D.C., respectively.

A pamphlet from U.S. Recognition Inc./Norwest Mortgage/Pacific Bell concerning their MLS system from either Nov. 1991 or May 1992 NAR Trade Show in Las Vegas or Wash., D.C., respectively.

A brochure from Moore Data Management Services Division concerning its Super-Trive ® and Viewpoint TM from either Nov. 1991 or May 1992 NAR Trade Show in Las Vegas or Washington, D.C. respectively.

A pamphlet from Win-Broker's software from either Nov. 1991 or May 1992 NAR Trade show in Las Vegas or Washington, D.C., respectively.

(List continued on next page.)

OTHER PUBLICATIONS

A brochure pertaining to Vision Imaging's FOTOfiler ™ Image Database Management Software from either Nov. 1991 or May 1992 NAR Trade Show in Las Vegas or Washington, D.C., respectively.

A pamphlet from Vision Imaging concerning its Media Master Multimedia Authoring Software from either Nov. 1991 or May 1992 NAR Trade Show in Las Vegas or Washington, D.C., respectively.

A pamphlet from U.S. Recognition Inc. concerning its MLS system from either Nov. 1991 or May 1992 NAR Trade Show in Las Vegas or Washington, D.C., respectively.

A pamphlet from Realty Information Systems Co. concerning its MLS system from either Nov. 1991 or May 1992 NAR Trade Show in Las Vegas or Washington, D.C., respectively.

A brochure from Opticom from either Nov. 1991 or May 1992 NAR Trade Show in Los Vegas or Washington, D.C., respectively.

A brochure from SoftwareSciences concerning its SuperCMA program from either Nov. 1991 or May 1992 NAR Trade Show in Las Vegas or Washington, D.C., respectively.

A sheet pertaining to BGS&G Real Estate from Nov. 1991 or May 1992 NAR Trade Show In Las Vegas or Washington, D.C., respectively.

A brochure from Realtron concerning its Spectrum hardware and software from Nov. 1991 or May 1992 NAR Trade Show in Las Vegas respectively.

COMPUTER IMPLEMENTED METHOD AND SYSTEM FOR STORING AND RETRIEVING TEXTUAL DATA AND COMPRESSED IMAGE DATA

A portion of the disclosure of this patent document contains material that is subject to copyright protection. The copyright owner (and co-inventor of this patent) has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to a computer implemented method and system for storing and retrieving data representing textual information, and compressed data representing images. In particular, this invention relates to a computer implemented method and system for compressing and storing image data, and for storing, separate and apart from the image data, related textual data, a portion of which references the compressed image data. The method and system of the present invention also retrieves and makes available for viewing by a user the pictorial representations of the stored compressed image data and the related textual information stored separately as textual data, in response to a user search query which selects particular values or ranges for predetermined search criteria represented in the textual data.

BACKGROUND OF THE INVENTION

The present invention, which relates primarily to a computer implemented method and system for storing and retrieving images and textual information relating to those images, was discovered in an effort to solve several problems associated with presently available means for real estate searching. Nonetheless, it is applicable to other areas as well, including, but not limited to, the sale of any product for which pictorial representations can be helpful in selling that product because direct viewing is impractical or inconvenient, for example, heavy equipment, vehicles and weapons systems. Because of its genesis, it is convenient to discuss the background of the invention in the context of its real estate application.

Traditionally, real estate, especially residential, is bought and sold through an intermediary, i.e., a real estate broker, who brings the buyer and seller together. Brokers use various methods to "screen" properties before presenting them to buyers. They may have a simple index card system containing information, often barren of pictures, about available properties; they may computerize their files to include those properties listed only with them; and/or they may belong to a multiple listing service, "MLS", which provides information regarding several different brokers' properties.

In some cases, a broker may have a MLS book which contains information about properties for sale and one picture, usually black and white, but now sometimes in color, of each home's exterior. MLS books are generally not distributed to buyers, nor can they automatically be searched for properties based on values or ranges satisfying particular search criteria. In addition, they contain only properties found in one particular geographical area.

In some areas, an MLS is provided on a computerized system which retrieves information via a telecommunications link based on a search specifying particulars as to predetermined criteria. While these systems are improvements, their visual displays are unattractive, and their interfaces are complicated to use, requiring much training On-line systems are also less reliable than on-site systems, due to the unpredictable quality of telecommunications connections. Further, some of these systems provide textual information only, while others provide either black and white or gray scale images along with the textual information. Those systems which provide images are slow in displaying them due to the quantity of image data which must be transmitted.

At least one MLS on-line system provides color pictures, i.e., the "BORIS" system which is used in the San Francisco area. That system uses analog telephone lines to transmit pictures and other informational data from a remote central computer to the local user system. However, it provides only one picture per property, the picture transmission time is so long it prevents the display of multiple images; the color depth is extremely limited; and its resolution is poor.

One large brokerage firm in the New York Tri-state area currently distributes a book which has 10,000 to 15,000 color pictures of properties. However, it contains only one picture per property, usually the exterior of a home; it contains only local properties, and only those which are listed with that brokerage firm; and it cannot be automatically searched.

The HOMEVIEW system, a computer implemented system not connected to an MLS and now used in Needham, Mass., provides multiple color images for real estate through use of a touch screen-operated computerized system. The HOMEVIEW system has search capabilities based upon an expansive list of predetermined criteria which can also be map driven. The detailed manner in which the HOMEVIEW system works, as far as applicants are aware, has not yet been made public. However, from casual observation and review of HOMEVIEW's promotional literature, it appears that the system operates on a workstation-level computer, with a screen larger than a standard microcomputer color monitor, and would therefore be extremely expensive. Further, HOMEVIEW requires a skilled technician to operate it, and it stores properties in a single local geographic area only. Because HOMEVIEW has been designed to operate at one site in that area, presumably its data cannot easily be duplicated and distributed to other microcomputers.

Another computer driven system is disclosed in PCT application No. WO 91/09368. That system purports to provide a rapid search and display, on a local computer monitor, simultaneously of graphical and related textual information contained on a "graphical relational database" and a large tabular database contained on both the local system and a host system, in response to a user search query entered into the local system.

Accordingly, each of the present methods and materials for searching real estate has one or more of the following deficiencies: it requires extensive time and effort to use, much of it wasted, because it provides no automatic search capabilities and/or pictorial representations, or if so, typically only a black and white one; where a color image is supplied, typically only one image is provided, limiting the ability to convey a fair and complete impression of the property's appearance; and/or the geographical areas covered are limited.

The existing computerized systems suffer, in addition, from many other problems, including one or more of the following: they are slow with respect to both searching and displaying images; they require extensive training before they can be used; the data contained on those systems cannot easily be duplicated and distributed to other systems, especially microcomputer systems; the color depth and resolution of any images are limited; the hardware required is expensive; and to the extent they are on-line, they are less reliable than on-site systems.

Although the system and method disclosed in PCT application No. WO 91/09368 helps solve some of these problems, it does not resolve all of them, and actually, creates others. To begin with, it uses graphical relational databases, which store textual data along with image data, thereby decreasing system efficiency, including an increase in search time. In addition, although it mentions data compression in passing, it fails to teach any way of compressing image data, and does not distinguish between data compression and image compression. Image compression typically produces much higher compression ratios than data compression. Moreover, PCT application No. WO 91/09368 fails to teach or suggest the advantage of maintaining compressed image data within the computer's internal memory, viz., this enables the computer to manipulate and store more images with higher color depth for simultaneous display on a computer monitor. Furthermore, it neither teaches nor suggests the creation of an external access routine for the purpose of allowing a database engine to utilize an operating system's own built-in compression capabilities, inaccessible directly by the database engine.

Clearly there is a need for a method and system, implemented in current microcomputer technology which is more cost effective; contains properties beyond a local geographical area; is more convenient to use, i.e., so that anyone with a microcomputer can use it; performs rapid automatic searches based on predetermined search criteria; displays more, clear and attractive photo-realistic images on a single display screen; is less frustrating, less time-consuming and more "user-friendly." These and other problems of the prior art are solved by the present invention.

SUMMARY OF THE INVENTION

The present invention provides a method and system, which may be implemented by an electronic digital microcomputer, for storing and retrieving data representing images and textual information for a number of items. The microcomputer may be a stand-alone device or part of a LAN or WAN. For each item, the method and system compresses and stores, in an image file, image data representing one or more pictures that are scanned into the system, and also stores, in one or two separate textual files, textual data, a portion of which references the image data related to the same item. When the textual data is stored in two files, the textual data contained in non-searchable textual fields is stored in one textual file separate and apart from the textual data contained in searchable textual fields, which are stored in a separate file and a portion of which references both the textual data contained in the non-searchable textual fields as well as the image data.

Various fields of the searchable textual fields are then searched by a user search query, embodying a set of particular values or ranges for predetermined search criteria. The search query can be entered by a pointing device in combination with a graphical user interface. For the items that meet the search criteria, various combinations of image and textual data, as selected by the user, are displayed on the computer monitor in accordance with predetermined formats.

Generally, this invention comprises two separate but inter-related modes. One mode compresses and stores the image data and stores, in one or two separate files, the textual data, i.e., the "storage" mode. The other mode retrieves and displays pictorial representations of the compressed image data along with its related textual information, stored as textual data, in response to a search query specifying values or ranges for one or more predetermined search criteria represented in the textual data, i.e., the "retrieval" mode. Both of these modes are combined to implement the overall method and system of the present invention.

Moreover, the data stored in the storage mode may be duplicated and distributed to one or more users at different locations, each with access to a microcomputer system, who will execute the retrieval mode. This method and system can be used where it would be impractical or inconvenient for a user to view the actual selected items, but where viewing pictorial representations of them along with textual data relating thereto is advantageous. This includes but is not limited to, the sale of real estate, heavy equipment, vehicles and weapons systems.

BRIEF DESCRIPTION OF THE DRAWINGS

Certain specific embodiments of the present invention are illustrated in the accompanying drawings, wherein.

DETAILED DESCRIPTION OF THE INVENTION

The present invention relates to a computer implemented method and system for storing and retrieving textual data and compressed image data in which the preferred embodiment includes a mode for storing the data, and a separate mode for retrieving the data. These two modes permit the creation, in the storage mode, of files which can be duplicated, distributed and used directly in the retrieval mode.

The storage mode creates and stores a file of compressed image data, and one or two separate files of related textual data. These files can be duplicated and distributed to users at numerous locations having microcomputer systems. In the retrieval mode, the users search certain fields of the textual data so as to retrieve and display textual information, stored as textual data, and pictorial representations of the compressed image data corresponding to items that satisfy particular values and ranges of predetermined user search criteria.

The storage and retrieval modes operate separate and apart from each other, and therefore, will be discussed separately. The manner in which these modes are combined into a single method and system for storing and retrieving textual data and compressed image data is described as well.

Figure 1:
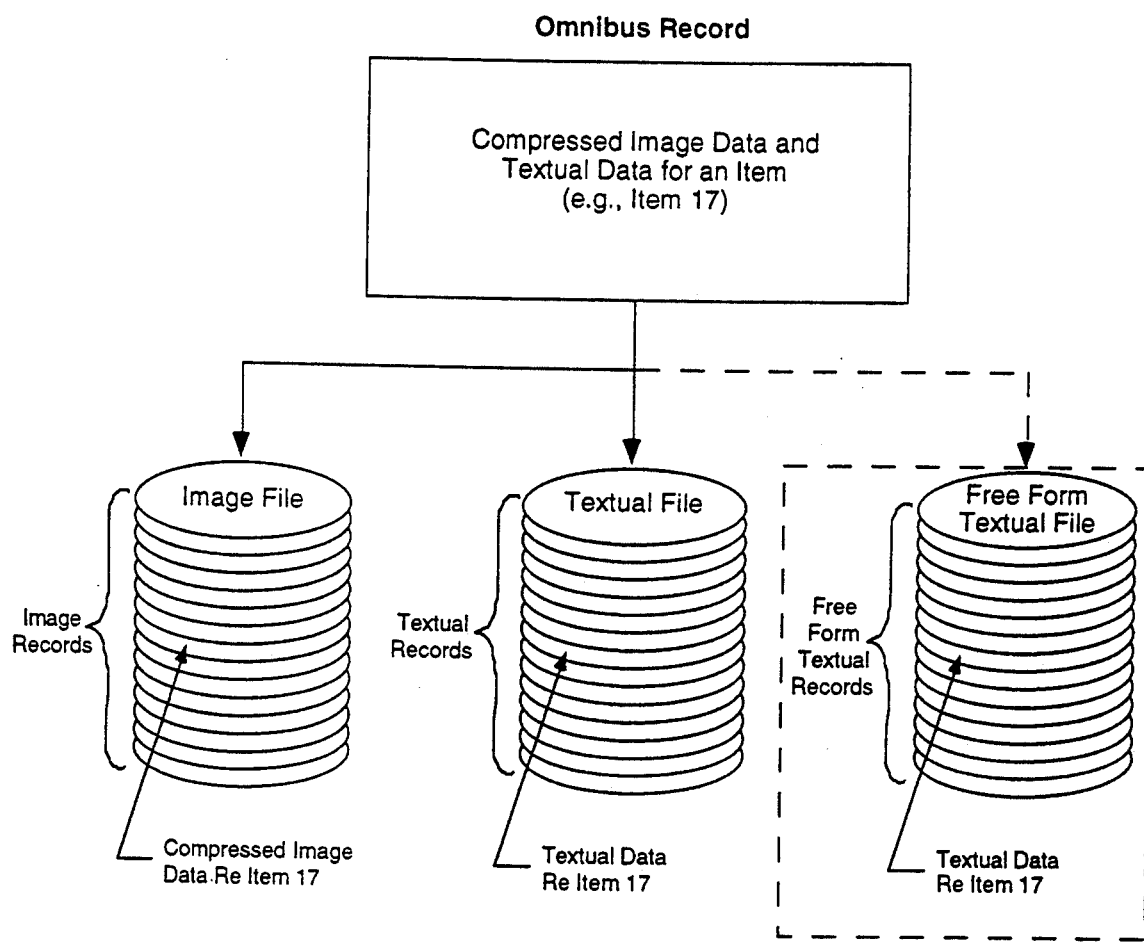
FIG. 1 is a diagram showing the data structure for the present invention.

Before describing the storage and the retrieval modes, it is helpful to begin with the data structure of the present invention, for that structure is at the core of the present invention. The data structure of the present invention is set forth in FIG. 1. For each item to be included in the method and system, an "Item", an "Omnibus Record" is created. Certain fields of the Omnibus Record contain image data, and the remaining fields contain textual data, representing textual information and numerical information, i.e., "textual information", of which certain fields maybe searched using appropriate software. The Omnibus Record contains one image field for each photograph or picture relating to the Item. It also contains one textual field for each of a predetermined number of search criteria, i.e., "searchable textual field", and at least one field for non-searchable textual information, i.e., "non-searchable textual field". Thus, for example, if there are 13 criteria available for searching, the Omnibus Record contains at least 14 textual fields, even though for some Items, certain of these fields may be left blank.

According to the invention, once each Omnibus Record has been created, it is split into either two or three parts depending upon the embodiment used. The image fields of the Omnibus Record become the "Image Record." In one embodiment all of the textual fields become the "Textual Record" for that Item. In another embodiment, the searchable textual fields become the "Textual Record," while the non-searchable textual fields become the "Free Form Textual Record" for that Item. Further, in both embodiments the Textual Record includes as one searchable textual field, which may or may not correspond to one of the predetermined search criteria which can be used as part of a search query, a sequence number unique to the particular Item, while the Image Record and Free Form Textual Record, if one exists, are each given a record file name corresponding to that sequence number, such that the Textual Record provides a unique reference to the Image Record and the Free Form Textual Record. The collection of the Textual Records for all of the Items comprises the "Textual File", whereas the collection of all Image Records comprises the "Image File". If the textual data is split, separating the searchable textual fields from the non-searchable textual fields, the collection of all Free Form Textual Records comprises a "Free Form Textual File."

Initially, the Image File, the Textual File and the Free Form Textual File, if one is used, are created as part of the storage mode. Multiple replicas are made of these files, and they are distributed to various users for use in the retrieval mode.

In the retrieval mode, users search only the Textual File of a replica via a search query framed in terms of the predetermined search criteria to determine which Textual Records satisfy the search criteria, and thus which Items are of interest to the user. Then based on the selected Textual Records, the retrieval mode can retrieve from the Image File, one or more of the image fields of the Image Records which corresponds to the selected Textual Records so that one or more images for a particular item, or multiple items, can be displayed along with some or all of the related textual information, represented as textual data, which is retrieved from the corresponding Textual Record or Records. In addition, based on the selected Textual Records, if a Free Form Textual File exists, the textual data contained in the non-searchable textual field or fields located in a Free Form Textual Record can be retrieved and displayed along with data from the Textual Record and Image Record which correspond to it. In this way the retrieval mode, search and retrieval, are accomplished without the necessity of searching or retrieving the Image File, which is much more voluminous than the Textual File even though the image data is compressed.

Figure 2:
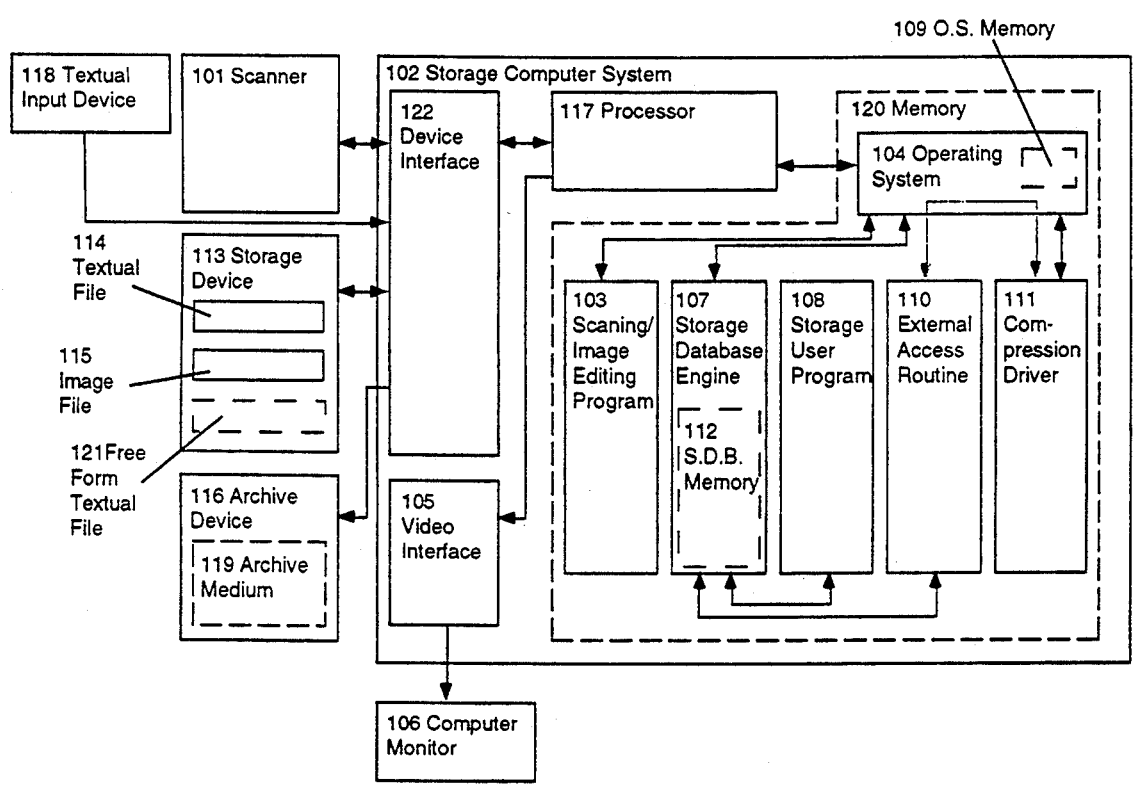
FIG. 2 is a block diagram representation of a system for compressing and storing image data, and for storing in one or two separate files, textual data related to the image data.

Referring to FIG. 2, the storage system of the preferred embodiment of the present invention comprises a storage computer system 102 which is connected through a video interface 105 to a computer monitor 106, and is connected through a device interface 122 to the following: a scanner 101; a storage device 113 containing a Textual File 114, a separate Image File 115, and in some cases, a separate Free Form Textual File 121; an archive device 116 containing an archive medium 119; and a textual input device 118. The storage computer system contains memory 120, a processor 117, and the video and device interfaces.

In a single user configuration, the device interface connecting the storage device to the storage computer system maybe an SCSI interface. However, the present invention can also utilize LAN or WAN technology to connected multiple storage computer systems to a single storage device.

The preferred embodiment of the present invention utilizes a Macintosh IIci computer as its storage computer system. However, other computers like an IBM PS/2 or an IBM PS/2 compatible, a Sun Microsystems SPARCStation, a Silicon Graphics IRIS or Indigo system, or a NeXT Computer NeXTStation can be used in place of a Macintosh Iici computer.

The storage computer system is able to load into its memory 120 an operating system 104. That portion of memory used by the operating system is known as the operating system memory, i e., "O.S. memory" 109. The operating system loads a compression driver 111 into the O.S. memory. Thereafter, a scanning/image editing program 103 and/or a storage database engine 107 are loaded into the memory. The storage database engine loads a storage user program 108 and an external access routine 110 into that portion of the memory used by the storage database engine, i.e., the storage database memory, i.e., "S.D.B. memory" 112.

In the preferred embodiment, the operating system utilized by the present invention is the Macintosh Operating System version 7.0. Nevertheless, other operating systems like Microsoft Windows version 3.0, NeXtStep, OS/2, Unix or Xenix can be used as well.

In the preferred embodiment, the user instructs the storage computer system 102 to begin the process of storing data, pertaining to one or more Items, by means of the storage user program 108. That program can be written in any of a number of programming languages. However, in the preferred embodiment, the language used is 4th Dimension by ACIUS. Procedures for a storage user program written in 4th Dimension which can be used as part of the present invention is reproduced hereafter.

Once the user instructs the storage user program 108 to begin the data storage, the storage user program sends a command to the storage database engine 107 to create in the S.D.B. memory 112 an Omnibus Record, concerning one of the Items for which data is being stored. An Omnibus Record consists of one or more fields, each of which contains data representing an image, i.e., "image data", and several fields representing textual and/or numerical information i.e., "textual data". For most of the textual fields, each contains data regarding one of several predetermined search criteria which may or may not be able to be used as part of a search query, such that those fields are searchable; however there maybe at least one textual field, which contains textual data, that is not searchable. In the preferred embodiment, an Omnibus Record will contain image data pertaining to six photographs, slides or transparencies, all relating to the same Item, and textual data, contained in searchable and at least one non-searchable textual fields, relating to a number of facts about, and characteristics relating to, that Item.

The storage database engine 107 of the preferred embodiment of the present invention uses the 4th Dimension database engine developed by ACIUS. Other database engines which are capable of displaying at least gray scale images via the storage user program 108 can be used as well. However, in the preferred embodiment, the pictorial representations of color image data will be stored. Therefore, the storage database engine should be able to display color images via the storage user program. Additional available database engines which can do this include Blyth Software's Omnis 7 or Fox Software's FoxBase or FoxPro.

Once the storage database engine 107 has been instructed to create an Omnibus Record for an Item, the storage user program 108 displays on the computer monitor 106 one of the data entry layouts, i.e., either an image data entry layout or a textual information data entry layout, to facilitate the entry of information, i.e., textual, numerical and/or pictorial, necessary to create the Omnibus Record. Moreover, if data for multiple images regarding the Item will be made a part of the Omnibus Record, one of the image data fields will be designated as the primary image data field and the pictorial representation corresponding to it will be identified as the primary image on the image data entry layout. The significance of the primary image will become clear from the discussion found below.

Depending upon which type of data entry layout appears on the computer monitor 106, the user will start either image entry or textual information entry. In the preferred embodiment, the images are entered first, with the primary image being entered before the others.

When an image data entry layout is displayed on the computer monitor 106, the user places a photograph, slide or transparency into a digital scanner 101 which is attached to the storage computer system 102. The digital scanner must be capable of creating at least gray scale image data. In the preferred embodiment, the scanner can scan color photographs, slides and/or transparencies so as to create color image data. This includes scanners like the UMAX UC630 or the LaCie Silverscanner.

The scanning/image editing program 103 which controls the operation of the scanner 101 can be used to manipulate the digital image data created by the scanner. The present invention can utilize software such as Adobe Photoshop TM or Fractal Design ColorStudio as its scanning/image editing program.

Together, the scanner 101, the storage computer system 102, and the scanning/image editing program 103, scan and divide the color photograph, slide or transparency into many pixels. Each pixel is assigned a color which approximates the color in its respective position on the photograph, slide or transparency. Each pixel contains a color depth of either eight, sixteen or thirty-two bits. All of the pixels for a given image must be of the same color depth.

An eight-bit image may contain as many as 256 colors; a sixteen-bit image may contain approximately 32,000 colors; and a 32-bit image may contain approximately 16.7 million colors. Therefore, the greater the bit depth, the more accurately the image data may be reproduced on the computer monitor 106. This accuracy is limited, however, by the capabilities of the video interface 105, which may be capable of displaying either eight, sixteen or thirty-two bit color depth. In the event of a discrepancy between the color depth of the image data and the color depth available on a computer monitor because of the video interface, the pictorial representation of the image data will appear on the monitor at the lower of the two color depths. For instance, a thirty-two bit image displayed using eight bit video circuitry will contain no more than 256 colors. In the preferred embodiment the image data has 32 bits color depth, and the video interface is capable of displaying 32 bit color.

After the photograph, slide or transparency has been scanned into the storage computer system 102, its uncompressed digital image data obtained from the scanner 101 may be edited with the scanning/image editing program 103. Such editing may involve enhancing the color balance, brightness or contrast of the image, or removing or cropping unwanted artifacts or regions from the image data's pictorial representation.

Once editing of the uncompressed image data is complete, the user sends a command to the operating system 104 to place a copy of the uncompressed image data into the O.S. memory, 109. Next, the user sends a command to the operating system through the storage user program 108 and storage database engine 107 to transfer to the S.D.B. memory 112 the uncompressed image data resident in O.S. memory as an image field for the Item. The storage user program then instructs the storage database engine to display a pictorial representation of the uncompressed image data contained in that image field on the computer monitor 106 for the user's confirmation.

The user then sends a command, via the storage user program 108, to the storage database engine 107 which activates the external access routine 110. This routine enables the storage database engine to access, via the operating system 104, a compression driver 111 resident in the O.S. memory 109. Without the external access routine, the storage database engine would be unable to access the compression driver, either directly or via the operating system. The external access routine in the preferred embodiment is written in THINK Pascal, and can also be written in THINK C, as well as other programming languages. An external access routine written in THINK Pascal which can be used as part of the present invention is reproduced hereafter.

The storage database engine 107 then passes to the external access routine 110 a memory address pointer which references the locations of the uncompressed image data in the image field in the S.D.B. memory 112. The external access routine attempts to find sufficient free memory in the S.D.B. memory to store a compressed representation of the uncompressed image data. If successful, it instructs the compression driver 111, via the operating system 104, to create a compressed representation of the uncompressed image data in the free memory locations.

The present invention achieves compression by utilizing the JPEG (Joint Photographic Experts Group) compression standard. The Joint Photographic Experts Group is an international group of image compression experts formed in 1986 by the International Standards Organization to develop techniques for the removal of redundant information from gray scale and color images, for the purpose of reducing image storage requirements.

The preferred embodiment of the present invention makes use of a certain operating system software tool, specific to the Macintosh family of computers, known as QuickTime ™, to compress image data using the JPEG standard. The external access routine 110 enables the storage user program 108 to access the QuickTime ™ software for the purpose of making a compressed representation of the uncompressed image data.

It should be noted that if the invention is configured to use, for instance, an Intel 80386 or 80486 microprocessor-based computer running Microsoft Windows software, the external access routine 110 could be developed to access compression software such as VT-COMPRESS by Xing Technology. In addition, should a more powerful compressor be added to the QuickTime ™ software, the external access routine could easily be modified to allow the invention to receive the benefit of the enhanced capability. Should the QuickTime ™ software itself be superseded by more advanced compression technologies, the routine can be adapted to access them.

Once the compression of the image field of the uncompressed image data has been completed, the external access routine 111 changes the memory address pointer passed to it by the storage database engine 107 so that it now references the locations of the compressed image data in S.D.B. memory 112. Next, the external access routine releases the memory occupied by the uncompressed image data. Then the external access routine passes the memory address pointer back to the storage database engine.

If the user has an additional photograph, slide or transparency he or she wishes to add to the Omnibus Record, i.e., an additional photograph, slide or transparency regarding the same Item, the user can repeat the process explained thus far to add another image field of compressed image data to the Omnibus Record for the Item. This process is repeated until all of the photographs, slides or transparencies which the user wishes to make part of the Omnibus Record for the Item are entered, each in a separate image field.

When the user has finished adding all of the images for the Item into an Omnibus Record, he or she sends a command from the storage user program 108 to display a textual information data entry layout. Thereafter, the user can enter textual information concerning the photographs, slides and/or transparencies, or the Item to which they relate.

This textual information is entered into the storage computer system 102 by means of a textual input device 118. That device can be a mouse, keyboard, light pen, OCR scanner or some other well established means or combination thereof. In the preferred embodiment, the textual input device is a combination of a keyboard and a mouse.

The organization of the textual information can vary. However, it should be organized in such a manner that most of it can be readily searched based upon particular predetermined search criteria to ascertain whether the textual information contained in a given textual field satisfies selected values or ranges. In a real estate application, these criteria, and the textual information contained in a textual field, could include property location, lot size, selling price, or the like. In the preferred embodiment, the textual information, whether corresponding to particular search criteria or not, should be entered into labelled data entry areas which should appear on the textual information data entry layout.

When all of the photographs, slides and/or transparencies, and textual information for a particular Item have been entered into the S.D.B. memory 112, the S.D.B. memory will contain all of the image data and textual data for that particular Omnibus Record. The user then sends a command to the storage user program 108 to save the Omnibus Record to a storage device 113. The storage user program then does three things.

First, it checks the Textual File 114 contained on the storage device 113 to determine which sequence numbers have already been assigned to other Omnibus Records, and it creates a new and unique sequence number for the current Omnibus Record. That sequence number is then placed in the O.S. memory 109 as part of the Omnibus Record in one of the searchable textual fields which may or may not correspond to one of the predetermined search criteria which can be used as part of a search query. The sequence number becomes a unique and permanent reference to that Omnibus Record and can never again be used or assigned to any other Omnibus Record.

Second, the storage user program 108 instructs the storage database engine 107 to save in the Image File 115 on the storage device 113 those fields from the current Omnibus Record that contain compressed image data. Those fields of the Omnibus Record which contain the image data are written to the Image File from the S.D.B. memory 112 as a single Image Record. That Image Record is named according to the unique sequence number already assigned to the Omnibus Record from which the Image Record comes.

Finally, the storage user program 108 instructs the storage database engine 107 to do one of the following, depending upon which embodiment of the present invention is being utilized. In one embodiment, the storage database engine writes all of the textual data, including the sequence number, as a Textual Record to the Textual File 114 contained in the storage device 113. In the other embodiment, the storage database engine first writes the non-searchable textual field or fields containing textual data as a Free Form Textual Record to the Free Form Textual File 121 contained on the storage device, and names it according to the unique sequence number already assigned to the Omnibus Record from which the Free Form Textual Record comes. Thereafter the storage database engine writes the remainder of the textual data, including the sequence number, i.e., the searchable textual fields, as a Textual Record to the Textual File, contained on the storage device. Because in both embodiments the sequence number is stored as part of the Textual Record, that record can always be used to reference the Image Record and Free Form Textual Record, if one exists, which contains data for the same Item. In the present invention a variety of types of storage devices can be used, including a conventional computer hard disk, an optical or magnetic disk, or a WORM, i.e., write-once-read-many, disk.

If these three tasks are not successfully accomplished, the storage database engine 107 and/or the storage user program 109 notifies the user that an error which prevented completion has occurred. If these tasks have been successfully accomplished, the storage user program instructs the storage database engine to free the locations in S.D.B. memory 112 occupied by the data of the entire Omnibus Record. Thereafter, the user can begin the entire storage process over again to create in the S.D.B. memory 112 an additional Omnibus Record which will then be split such that the image data fields will be put in an Image File 115 as an Image Record, and the textual data fields, including the sequence number, will be placed in the Textual File 114, on the storage device 113, as a separate Textual Record; and where appropriate, the non-searchable textual field or fields will be put in a separate Free Form Textual File 121 as a Free form Textual Record.

When all of the data for the Items which a user wishes to store have been created and stored in the appropriate files on the storage device, the user sends a command to the operating system to transfer the Image File 115, the Textual File 114, and the Free Form Textual File 121, if one is used, to an archive device 116, which writes the data to the appropriate archive medium 119. In addition, a retrieval user program 214 and a retrieval user database engine 208, see FIG. 3, for use in searching, retrieving and displaying the data created by the storage computer system may be placed on the archive medium as well.

The manner in which the data and software is transferred to the archive medium 119 will depend upon what type of archive device 116 is used. The archive device of the present invention can include DAT tape drives, 8 mm Exabyte drives, SyQuest cartridges, ¾" U-matic or nine-track tape machines and WORM drives each utilizing appropriate storage media. How data and software is transferred to these devices is well established in the art, and any of those techniques can be used as long as they work with the archive device and archive media chosen.

The archive medium 119 is used to create a duplication master of the compressed image data and textual data for duplication and distribution to users, who will search, retrieve, and view pictorial representations of the compressed image data along with the textual information relating thereto.

The duplication process entails making a duplication master of all data contained on the archive device 116. Thereafter, replicas of the duplication master are made for distribution. In the preferred embodiment, the duplication master is a CD-ROM master, and the replicas of it are CD-ROM disks.

CD-ROM media has a very high data storage capacity, presently approximately 700 megabytes per disk, and therefore, can hold a substantial quantity of compressed image data and textual data. CD-ROM media has an additional advantage in that the disks are inexpensive to reproduce, i.e., about $2 per disk. It should be noted, however, that the present invention can also make use of future digital media technologies which may offer superior storage, speed and cost advantages. Such technologies may include increased-capacity magneto-optical drives or the optical card technology being developed by Urshan Research.

Once the duplication replicas are made, they can be distributed worldwide, by mail, courier or other similar means, to any person who has a retrieval computer system 204 such as the one described below, see FIG. 3. Moreover, by putting the retrieval user program 214 and the retrieval database engine 208 on the archive device 116, these programs, including modifications of them, can also be made available to the users of the compressed image data and its related textual data. It is the creation, distribution and eventual use of these duplication replicas which relate the storage mode of the present invention to the retrieval mode of the present invention.

Figure 3:
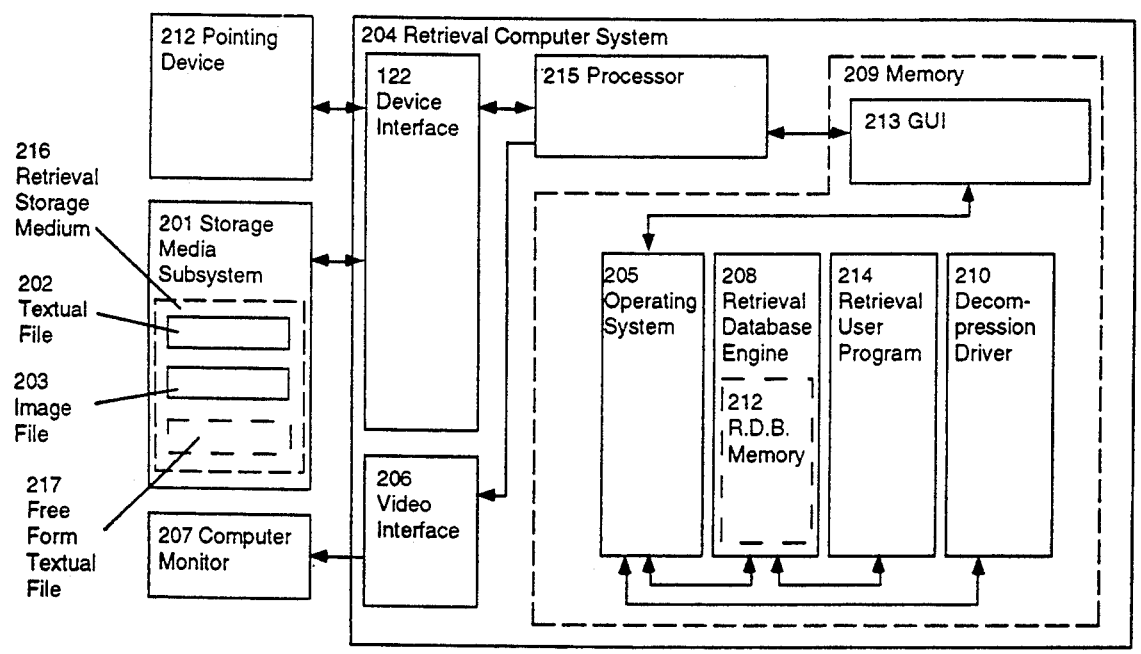
FIG. 3 is a block diagram representation of a system for retrieving and displaying pictorial representations of compressed image data along with related textual information, stored separately as textual data, after a search, based upon a query pertaining to specific values or ranges for one or more predetermined search criteria represented in the textual data, has been performed.

Referring to FIG. 3, the retrieval system of the present invention comprises a retrieval computer system 204 which is connected through a video interface 206 to a computer monitor 207, and is connected through a device interface 122 to the following: a pointing device 212; a storage media subsystem 202 which utilizes a removable retrieval storage medium 216, containing a Textual File 202, an Image File 203, and in some instances, a Free Form Textual File 217. The retrieval computer system contains memory 209 and a processor 215, and the video and device interfaces.

In a single user configuration, the device interface connecting the storage media subsystem to the retrieval computer system maybe an SCSI interface. However, the present configuration also utilizes LAN or WAN technology to connect multiple retrieval computer systems to a single storage media subsystem.

The preferred embodiment of the present invention utilizes a Macintosh IIci computer as its retrieval computer system 214. However, other computers like an IBM PS/2 or an IBM PS/2 compatible, a Sun Microsystems SPARCStation, a Silicon Graphics IRIS or Indigo system, or a NeXT Computer NeXTStation can be used in place of a Macintosh Iici computer.

The retrieval computer system 204 is able automatically to load an operating system 205, and thereafter, any of the following additional elements into its memory 209: a graphical user interface, i.e., "GUI" 213, a retrieval database engine 208, a retrieval user program 214 and a decompression driver 210. The retrieval database engine 208 uses a portion of the memory which we call the retrieval database memory ("R.D.B. memory") 211.

In the preferred embodiment, the operating system 205 utilized by the present invention is the Macintosh Operating System version 7.0. Nevertheless, other operating systems like Microsoft Windows version 3.0, NextStep, OS/2, Unix or Xenix can be used as well.

In the preferred embodiment, a user begins a retrieval session, i.e., a search, retrieval and display session, by sending a command to the operating system 205 instructing the retrieval computer system 214 to load the retrieval database engine 208 and the retrieval user program 214 into memory 209.

The retrieval user program 214 can be written in any programming language. However, in the preferred embodiment, the language which is used is 4th Dimension by ACIUS. Procedure a retrieval user program written in 4th Dimension which can be used as part of the present invention is reproduced hereafter.

The retrieval database engine 208 of the preferred embodiment of the present invention uses the 4th Dimension database engine developed by ACIUS as well. Other database engines capable of displaying at least gray scale images via the retrieval user program 214 can be used alternatively. However, in the preferred embodiment, the pictorial representations of the image data will be displayed in color. Therefore, the retrieval database engine should be able to display color images via the retrieval user program. Additional available database engines other than 4th Dimension which can do this include Blyth Software's Omnis 7 or Fox Software's FoxBase or FoxPro.

Once the retrieval user program 214 and the retrieval user database engine 208 have been loaded into the memory 209, the user creates a search query for locating data of interest contained on the retrieval storage medium 216. This search query is constructed by specifying certain values and ranges for one or more of a set of predetermined search criteria embodied in most of the textual fields of the Textual Records contained in the Textual File 202 of the retrieval storage medium. If the embodiment being utilized is one which contains a Free Form Textual File 217 on the retrieval storage medium, each of the textual fields of the Textual Records contained in the Textual File, of the retrieval storage medium, can be referenced by an appropriate search criterion.

In the present invention one of the distribution replicas of the duplication master created from the archive medium 119, described above, is used as the retrieval storage medium 216 for the storage media subsystem 201. In the preferred embodiment, the retrieval storage medium is a CD-ROM replica disk of the CD-ROM master created from the archive medium 119 described above with respect to the storage system. Likewise, the invention is also capable of utilizing future digital media technologies which may offer superior storage, speed and cost advantages.

Like the archive device 116 of the storage system, the retrieval storage medium 216 of the storage media subsystem 201 of the retrieval system contains a Textual File 202, an Image File 203, a retrieval user program 214, a retrieval database engine 208, and in some instances, a Free Form Textual File 217. It should be noted, once again, that because both the retrieval user program and the retrieval database engine may be distributed on the distribution replicas, which become the storage medium of the retrieval system, improvements to these programs can be provided to the users concurrently with new or updated data files.

The search query is created using the pointing device 212, which interacts with the GUI 213, to send commands, via the operating system, to the retrieval user program 214. The retrieval user program is further designed so that all user search input can be accomplished without resorting to a keyboard, i.e., through the exclusive use of a pointing device, although a keyboard can also be used. The search query may be formulated with as simple or complex a list of available predetermined search criteria as necessary. The retrieval user program is designed to assist the user in formulating the search query by displaying on the computer monitor 207 graphic images such as maps and/or diagrams, not relating specifically to the image data stored on the Image File 203 of the retrieval storage medium 216, if appropriate, and textual search criteria options.

The pointing device 212 for the preferred embodiment of the present invention is a touch screen. A touch screen consists of a transparent cover over the screen of the computer monitor 207, which cover is sensitive to heat, pressure or minute electrostatic changes caused by the touch of a hand. When the pointing device is a touch screen, the interface elements of the retrieval user program 214 are designed so that they may be manipulated solely by touch, i.e., the graphical interface elements are not so small that a fingertip could potentially cover more than one. A touch screen is preferred because many users are familiar with its function due to its popularity in automatic banking and other kiosk-type computer applications. Nonetheless, the retrieval computer system can alternatively use other pointing devices, including a mouse, a trackball or a pen-type stylus.

When the user's search query has been promulgated, the user sends a command through the pointing device 212, the GUI 213 and the operating system 205 to the retrieval user program 214 to initiate a search of the appropriate fields of the Textual Records contained in the Textual File 202 of the retrieval storage medium 216. Concurrent with the search, the retrieval database engine 208 creates a table of data, i.e., "the table", in the R.D.B. memory 211, identifying each Textual Record satisfying the search criteria.

Next, the retrieval user program 214 displays on the computer monitor 207 a primary layout page for displaying pictorial representations of the image data contained in the image fields corresponding to the primary images—stored in the Image File 203 of the retrieval storage medium 216—whose Image Records are referenced by the Textual Records identified in the table. In the preferred embodiment, that layout page contains the pictorial representations of the image data for the primary image field of six Image Records referenced by six of the Textual Records identified in the table. The number of displayed pictorial representations is limited only by the size of the computer monitor used, and the amount of random access memory, i.e., RAM, present in the retrieval computer system 204. Hence, it is possible that more or fewer pictures could be displayed at one time.

For purposes of the following discussion, it will be assumed that not more than six pictures will be displayed on a primary layout page at one time. Moreover, the retrieval user program 214 must be able to display several primary layout pages because in many searches more than six Textual Records will match the search query.

A primary layout page is created as follows. First, the retrieval database engine 208 identifies the first Textual Record identified in the table. Then the retrieval database engine locates on the Textual File 202 the textual field containing the sequence number for the first Textual Record identified in the table, and the retrieval database engine loads that field into the R.D.B. memory 211. Next, the retrieval user program 214 locates, in the Image File 203 on the storage media subsystem 216, the image data from the primary image field of the Image Record referenced by the sequence number just loaded into the R.D.B. memory. Then, the retrieval user program instructs the retrieval database engine 208 to load that primary image field into the R.D.B. memory.

The retrieval database engine 208 then calls the operating system 205 to display, on the computer monitor as part of a primary layout page, a visual representation of the image data contained in the primary image field for that Image Record. Because the data in the Image File has been compressed (see the discussion above on the storage system), the operating system calls the decompression driver 210 to decompress the image data of the primary image as it is displayed on the computer monitor 207.

The present invention achieves decompression by utilizing the JPEG decompression standard. The preferred embodiment of the present invention makes use of a certain operating system software tool, specific to the Macintosh family of computers, known a QuicktimeTM to decompress image data using the JPEG standard.

It should be noted that if the present invention is configured to use, for instance, an Intel 80386 or 80486 microprocessor-based computer running Microsoft Windows software, it could use decompression software such as VT-COMPRESS by Xing Technology. In addition, should a more powerful decompressor be added to the QuickTimeTM software, the present invention can receive the benefit of the enhanced capability. Should the QuickTimeTM software itself be superseded by more advance decompression technologies, the present invention can be adapted to access them.

This process is repeated until the primary images referenced by the first six Textual Records identified in the table are displayed on the computer monitor 207. In the preferred embodiment, each of these six primary pictorial representations is displayed on the primary layout page along with some of the textual information contained as textual data in their related Textual Records. For example, in a real estate application, one might find the location and price displayed along with each of the six primary images. Before that information can be displayed, the retrieval database engine 208 must locate the appropriate textual fields containing the textual data representing that information from each of Textual Records for which primary images are displayed and retrieve those textual fields into the R.D.B. memory, 212.

Once the primary layout page has been viewed, the user can determine whether he or she is interested in examining more details about any of the Items depicted by the six displayed pictorial representations, i.e., the six primary images, he or she is presently reviewing. If the user does not find any of the Items depicted by the displayed primary images to be of particular interest and wishes to review other Items, he or she sends a command to the retrieval user program 214 to construct the next layout page of primary images. Then, the R.D.B. memory 211 occupied by the present primary image data and the related textual data is cleared, and the process just described is repeated for the next six primary images referenced by the next six Textual Records identified in the table, so as to create a new primary layout page on the computer monitor 207.

If a user finds an Item depicted by one of the primary images to be of interest, he or she can choose to examine additional information concerning that Item, including other images pertaining to it. To do this, the user sends a command to the retrieval user program 214 identifying the primary image in which he or she is interested. This is done by means of the pointing device 212. The retrieval user program 214 then sends an instruction to the retrieval database engine 208 to clear the primary image data and the related textual data currently in the R.D.B. memory 211. The retrieval user program then loads all of the data from the Image Record that contains the primary image which was selected into the R.D.B. memory. Next, the retrieval user program creates and displays on the computer monitor an Item layout page which displays a pictorial representation of all of the images presently contained in the R.D.B. memory. All of those images pertain to the same Item. As described above, the operating system 205 calls the image decompression driver 210 to decompress the image data as the image is displayed on the screen.

In the preferred embodiment, the Item layout page is designed so that some of the textual information corresponding to the Item depicted by the pictorial representations displayed on that page is displayed along with those pictorial representations. For example, in a real estate application that textual information can include the name of the property; the broker or firm which is supervising the listing; the price of the property; and the total number of rooms, bedrooms and baths. However, before that information can be displayed, the appropriate textual fields containing the textual data representing that information from the Textual Record which references the Image Record containing the image data for the images being displayed on the Item layout page must be loaded into the R.D.B. memory 211.

In the preferred embodiment, the Item layout page is also designed so that one image is displayed in a large size, and the rest are displayed in the same smaller size. Initially the primary image is the large size image. The retrieval user program 214 is capable of swapping the image displayed in large size with another image displayed in the smaller size. To do this the user selects a smaller image using the pointing device 212 and the GUI 213.

From the Item layout page, the user can make a selection, via the pointing device 212 and the GUI 213, which will display additional textual information, available from the Textual Record and/or the Free Form Textual Record, if a separate Free Form Textual File 217 is employed, concerning the Item depicted by the images contained on the Item layout page displayed on the computer monitor 207. Before any of that textual data can be displayed, the retrieval database engine 216 must load the entire Textual Record and/or Free Form Textual Record, if there is a Free Form Textual File, for the Item for which the user requests additional textual information, so that the additional textual data can be displayed on the computer monitor 207 alone or along with the previously loaded textual data and pictorial representations.

After examining the images for an Item whose data is contained in the R.D.B. memory 211 and/or the related textual information, the user may send a command from either the Item layout page or the page containing additional textual information to the retrieval user program to either advance to the next selected Textual Record identified in the table or to go back to the previously selected Textual Record identified in the table. In either event, the retrieval user program sends a command to the retrieval database engine 214 to clear all of the image data and related textual data presently contained in the R.D.B. memory. The retrieval user program then locates and retrieves into the R.D.B. memory the textual field containing the sequence number for the chosen Textual Record identified in the table. Thereafter, the retrieval user program locates the Image Record referenced by the chosen Textual Record, and loads that Image Record data into the R.D.B. memory. As before, a pictorial representation of each of the compressed images held in the R.D.B. memory, is displayed on the Item layout page on the monitor, along with some of the textual data from the Textual Record for that Item, after the appropriate textual fields for that Textual Record are loaded in the R.D.B. memory. As described above, the operating system calls the image decompression driver to decompress the image data as it is displayed on the screen. The user may then examine the images in the same manner as with the previously viewed Item, including reviewing the additional textual information concerning that Item in the manner described above.

From the Item layout page or the page containing the additional textual data, the user may also instruct the user program to return to the primary layout page display. In this case, the image data and related textual data are cleared from R.D.B. memory 211, and the retrieval user program 214 again retrieves the primary image data fields of the six Image Records contained on the last primary layout page displayed, along with the appropriate textual fields, including the fields containing the sequence number for those six images, these fields being loaded first.

Finally, when the user is finished examining the results of his or her search query, he or she sends a command to the retrieval user program, 214, via the pointing device 212 and GUI 213, and the image data and the related textual data contained in the R.D.B. memory 208 are cleared. The retrieval user program 214 is then prepared to respond to another search query by creating a new table.

The means described above with respect to displaying the pictorial representations and related textual information is only one means, although at this time the preferred means, by which a user can view images and textual information pertaining to Items of interest. Other means which utilize the teachings of the present invention to allow a user to view and browse through pictorial representations and related textual information concerning Items of interest can be used as well.

Finally, the storage system and the retrieval system can be combined into a single system by connecting through a video interface a computer monitor, and by connecting through a device interface, the following: a pointing device; a storage device and/or storage media subsystem, containing an Image File, a Textual File, and where appropriate, a Free Form Textual File; a scanner; and a Textual Input Device. That system contains a processor and memory, which can contain an operating system, a compression/decompression driver, a scanning/image editing program, an external access routine, and a database engine and user program capable of performing both the storage mode and the retrieval mode of the present invention; and the video and device interfaces. Moreover, that user program would need to provide a means which would allow a user to select either the storage mode or the retrieval mode.

The following is a copy of the procedures for a storage user program written in 4th Dimension, which can be used as part of the present invention:

Procedures for Storage User Program

Written in 4th Dimension

©1992 Gib Veconi/SMILE™

Procedure NEW_RECORDS

```
` Add records to file referenced by $1»

INPUT LAYOUT([Countries];"InputCountry")

INPUT LAYOUT([Regions];"InputRegion")

INPUT LAYOUT([Areas];"InputArea")

INPUT LAYOUT([Sections];"InputSection")

INPUT LAYOUT([Properties];"InputProperty")

Repeat

ADD RECORD($1»)

Until (OK=0)
```

Procedure ADD_AREA

```
NEW_RECORDS (»[Areas])
```

Procedure ADD_COUNTRY

NEW_RECORDS (»[Countries])

Procedure ADD_CURRENCY

NEW_RECORDS (»[Currencies])

Procedure ADD_FIRM

NEW_RECORDS (»[Firms])

Procedure ADD_PROPERTY

NEW_RECORDS (»[Properties])

Procedure ADD_REGION

NEW_RECORDS (»[Regions])

Procedure ADD_SECTION

NEW_RECORDS (»[Sections])

Procedure INIT_PATHS

` Set up paths for info files and picture files pInfoPath:="SMILE HD:SMILE 2.0a$f$:smile.t:"

pPixPath:="SMILE HD:SMILE 2.0a$f$:smile.p:"

pMapPath:="SMILE HD:SMILE 2.0a$f$:smile.m:"

Procedure Startup

INIT_PATHS

INIT_CURR

MENU BAR(1)

Layout Procedure InputProperty

Case of

: (Before)

` Test for new property; if so, create smileIndex;

` if not, load iPropInfo and six iPict's

C_PICTURE(iPict1;iPict2;iPict3;iPict4;iPict5;iPict6)

If (smileIndex="")

smileIndex:=String(Sequence number([Properties]);"000000000")

Else $propInfo:=Open document(pInfoPath+smileIndex)

RECEIVE PACKET($propInfo;iPropInfo;Char(26))

CLOSE DOCUMENT($propInfo)

LOAD VARIABLE(pPixPath+smileIndex;iPict1;iPict2;iPict3;iPict4;iPict5;iPict6)

End if

: (After)

` Clean up iPict's

SAVE VARIABLE (pPixPath+smileIndex;iPict1;iPict2;iPict3;iPict4;iPict5;iPict6)

CLEAR VARIABLE(iPict1)

CLEAR VARIABLE(iPict2)

CLEAR VARIABLE(iPict3)

CLEAR VARIABLE(iPict4)

CLEAR VARIABLE(iPict5)

CLEAR VARIABLE(iPict6)

End case

Function enter_pix

` Function to display dialog for picture entry and compression

` $0 is the picture

```
C_PICTURE($0;ePix)
OPEN WINDOW(75;25;565;475;1)
DIALOG([Properties];"pixEntryDlog")
If (OK=1)
   err:=QTSqueeze (ePix;0)
   If (err#1001)
      ALERT("An error of type "+String(err)+" occurred."+Char(13)+"The entry could not be saved.")
   Else
      $0:=ePix
      CLEAR VARIABLE(ePix)
   End if
End if
```

The following is a copy of an external access routine written in THINK Pascal, which can be used as part of the present invention:

```
unit;QTSqueeze interface
 uses
  StandardFile, QDOffscreen, Components, ImageCompression;

function main (var thePict: PicHandle; var quality: integer): integer;
``` implementation

```pascal
function main (var thePict: PicHandle; var quality: integer): integer;

type
    PicEnd = record
      origin: Point;
      transfer: integer;
    end;

var
    theRef: integer;
    theCount, codecQual: longint;
    compPict: PicHandle;
    err: OSErr;
    p: Ptr;
    thePicEnd: PicEnd;

begin
    compPict := PicHandle(NewHandle(512));

if compPict <> nil then
     begin
      case quality of
        1:
          codecQual := codecLowQuality;
        2:
          codecQual := codecNormalQuality;
```

```
    3:
      codecQual := codecHighQuality;
    4:
      codecQual := codecMaxQuality;
    5:
      codecQual := codecLosslessQuality;
    otherwise
      codecQual := codecMinQuality
  end;
  err := CompressPicture(thePict, compPict, codecQual,
'jpeg');
  if err = NoErr then
    begin
      with thePicEnd do
        begin
        SetPt(origin, 1, 1);
        transfer := 1
        end;
      if PtrAndHand(@thePicEnd, Handle(compPict),
SIZEOF(thePicEnd)) = NoErr then
        begin
        KillPicture(thePict);
        thePict := PicHandle(compPict);
        main := 1001
        end
      else
        begin
        SysBeep(10);
        main := integer(err);
```

```
          end;
       end;
    end;
  end;
end.
```

The following is a copy of the procedures for a retrieval user program written in 4th Dimension, which can be used as part of the present invention:

Procedures for Retrieval User Program
Written in 4th Dimension
©1992 Gib Veconi/SMILE™

Procedure SETUP_CHOICES

```
mChoice1:=aChoiceBut{1}
mChoice2:=aChoiceBut{2}
mChoice3:=aChoiceBut{3}
mChoice4:=aChoiceBut{4}
```

Procedure MAP_DLOG

```
  ` Procedure to create MapDlog settings
  ` Parameters:
  `   $1-File number (if zero, then "World")
  `   $2-Generic country, region, or area name ` First get mMap and set up aChoiceBut array of choice button names
C_PICTURE(mMap)
If ($1=0)
```

```
LOAD VARIABLE(pMapPath+"World.m";mMap)

ALL RECORDS([Countries])

SELECTION TO ARRAY([Countries]countryName;aChoiceBut)

Else $mapId:=""

ALL RECORDS(File($1)»)

SEARCH(File($1)»;Field($1;$1)»=$2)

GOTO SELECTED RECORD(File($1)»;1)

For ($i;1;$1-1)

$mapId:=$mapId+Substring(Field($1;$i)»;1;3)+"."

End for $mapId:=$mapId+Field($1;$i)»+".m"

If (Field($1;$1+1)»=True)

LOAD VARIABLE(pMapPath+$mapId;mMap)

End if

RELATE MANY(Field($1;$1)»)

SELECTION TO ARRAY(Field($1+1;$1+1)»;aChoiceBut)

End if

SORT ARRAY(aChoiceBut;>)

SETUP_CHOICES mLocation:=$2

Function set_disp_choice

` $1-pointer to property number

` $2-pointer to dPix#

` $3-pointer to dSec#

` $4-pointer to dPrice#
```

C_PICTURE($2»)

If ($1<=Records in selection([Properties])

LOAD VARIABLE((pPixPath+aIndex{$1});$2»)

$3»:=aSection{$1}

$4»:aPrice{$1}

Else

CLEAR VARIABLE($2»)

$3»:=""

$4»:=""

End if

Procedure CLEAR_SINGLE

` Clear picture variables from single layout

CLEAR VARIABLE(sPix1)

CLEAR VARIABLE(sPix2)

CLEAR VARIABLE(sPix3)

CLEAR VARIABLE(sPix4)

CLEAR VARIABLE(sPix5)

CLEAR VARIABLE(sPix6)

Procedure SETUP_PAGE

` Set up page number vViewPage with pix and property info.

` First clear individual property pictures if they have been used.

CLEAR_SINGLE

C_PICTURE(dPix1;dPix2;dPix3;dPix4;dPix5;dPix6)

vStartProp:=((vViewPage-1)*6)+1

```
set_disp_choice (vStartProp;»dPix1;»dSec1;»dPrice1)

set_disp_choice (vStartProp+1;»dPix2;»dSec2;»dPrice2)

set_disp_choice (vStartProp+2;»dPix3;»dSec3;»dPrice3)

set_disp_choice (vStartProp+3;»dPix4;»dSec4;»dPrice4)

set_disp_choice (vStartProp+4;»dPix5;»dSec5;»dPrice5)

set_disp_choice (vStartProp+5;»dPix6;»dSec6;»dPrice6)

` Enable or disable navigation buttons
ENABLE BUTTON(bBack)

ENABLE BUTTON(bMore)

If (vViewPage-1=0)

DISABLE BUTTON(bBack)

End if

If (vViewPage+1>vPages)

DISABLE BUTTON(bMore)

End if

Procedure CLEAR_PAGE

` Clear all picture variables from DisplayPage
CLEAR VARIABLE(dPix1)

CLEAR VARIABLE(dPix2)

CLEAR VARIABLE(dPix3)

CLEAR VARIABLE(dPix4)

CLEAR VARIABLE(dPix5)

CLEAR VARIABLE(dPix6)

Procedure DISPLAY_PAGE vFound:=Records in selection([Properties])

DIALOG([Properties];"DisplayPage")
```

CLEAR_PAGE

Procedure VIEW_MANY

` Set vPages and vViewPage

If (Dec(Records in selection([Properties])/6)>0)

vPages:=(Int(Records in selection([Properties])/6)+1

Else vPages:=Records in selection([Properties])/6

End if vViewPage:=1

` Create array of index numbers, sections and prices

SELECTION TO ARRAY([Properties]smileIndex;aIndex;

[Properties]sectionName;aSection;[Properties]usCost;

aPrice)

SETUP_PAGE

DISPLAY_PAGE

Procedure VIEW_SINGLE

` Begin viewing individual properties, starting with $1

GOTO SELECTED RECORD([Properties];((vViewPage-1)*6)+$1)

DIALOG([Properties];"SingleProp")

Procedure BEGIN_HERE mCount:=0

MAP_DLOG (mCount;"World")

DIALOG([Countries];"MapDlog")

```
If (OK=1)

SEARCH([Properties];Field(4;mCount)»=mLocation)

VIEW_MANY

End if

If (mCount>0)

BEGIN_HERE

End if

Procedure SETUP_SINGLE

C_PICTURE(sPix1;sPix2;sPix3;sPix4;sPix5;sPix6)

LOAD VARIABLE(pPixPath+[Properties]smileIndex;

sPix1;sPix2;sPix3;sPix4;sPix5;sPix6)

sRooms:=String([Properties]rooms;"##0")+" rooms"

sBedrooms:=String([Properties]bedrooms;"##0")+" bedrooms"

sBathrooms:=String([Properties]bathrooms;"##0.0")+"

bathrooms"

sPrice:= [Properties]usCost $temp:=Open document(pInfoPath+[Properties]smileIndex)

RECEIVE PACKET($temp;sInfo;Char(26))

CLOSE DOCUMENT($temp)

Case of

: (([Properties]ownership="Fee Simple/Freehold") |

([Properties]ownership="Leasehold"))

sOwner:=[Properties]ownership sLegend:="Price:"+Char(13)+"Taxes:"+Char(13)+Char(13)+

"Rooms:"+Char(13)+"Bedrooms:"+Char(13)+"Bathrooms:"+
```

```
Char(13)
    sLegend:=sLegend+Char(13)+"Interior
area:"+Char(13)+"Lot size:"+Char(13)+"Views:"+Char(13)
    sFields:=conv_curr
([Properties]usCost)+Char(13)+conv_curr
([Properties]usTaxes)+Char(13)

sFields:=sFields+Char(13)+String([Properties]rooms;"##0")+
Char(13)+String([Properties]bedrooms;"##0")+Char(13)

sFields:=sFields+String([Properties]bathrooms;"#0.0")+Char
(13)+Char(13)+String([Properties]intArea;"###,##0")+" sq.
ft."+Char(13)

sFields:=sFields+String([Properties]lotSize;"###,##0.0")+"
acres"+Char(13)
    If ([Properties]views=True)
       sFields:=sFields+"Yes"
    Else
       sFields:=sFields+"No"
    End if
 : ([Properties]ownership="Condominium")
    sOwner:=[Properties]ownership
    sLegend:="Price:"+Char(13)+"Taxes:"+Char(13)+"Monthly
charges:"+Char(13)+Char(13)

sLegend:=sLegend+"Rooms:"+Char(13)+"Bedrooms:"+Char(13)+"B
athrooms:"+Char(13)
```

```
    sLegend:=sLegend+Char(13)+"Interior
area:"+Char(13)+"Views:"+Char(13)

sFields:=conv_curr
([Properties]usCost)+Char(13)+conv_curr
([Properties]usTaxes)+Char(13)+conv_curr
([Properties]usCharges)+Char(13)

sFields:=sFields+Char(13)+String([Properties]rooms;"##0")+
Char(13)+String([Properties]bedrooms;"##0")+Char(13)
sFields:=sFields+String([Properties]bathrooms;"#0.0")+Char
(13)+Char(13)+String([Properties]intArea;"###,##0")+" sq.
ft."+Char(13)

If ([Properties]views=True)
        sFields:=sFields+"Yes"
    Else
        sFields:=sFields+"No"
    End if
 : ([Properties]ownership="Cooperative")
    sOwner:=[Properties]ownership
    sLegend:="Price:"+Char(13)+"Maintenance:"+Char(13)+
Char(13)

sLegend:=sLegend+"Rooms:"+Char(13)+"Bedrooms:"+Char(13)+
"Bathrooms:"+Char(13)
    sLegend:=sLegend+Char(13)+"     Interior
                                  area:"+Char(13)+
                                  "Views:"+Char(13)
    sFields:=[Properties]usCost+Char(13)+
[Properties]usCharges+Char(13)
```

```
sFields:=sFields+Char(13)+String([Properties]rooms;"##0")+
Char(13)+String([Properties]bedrooms;"##0")+Char(13)

sFields:=sFields+String([Properties]bathrooms;"#0.0")+Char
(13)+Char(13)+String([Properties]intArea;"###,##0")+" sq.
ft."+Char(13)
    If ([Properties]views=True)
       sFields:=sFields+"Yes"
    Else
       sFields:=sFields+"No"
    End if
: ([Properties]ownership="Rental")
    sOwner:=[Properties]ownership
    sLegend:="Rental
cost:"+Char(13)+"Period:"+Char(13)+Char(13)+"Rooms:"+Char(
13)+"Bedrooms:"+Char(13)+"Bathrooms:"+Char(13)
    sLegend:=sLegend+Char(13)+"Interior
area:"+Char(13)+"Lot size:"+Char(13)+"Views:"+Char(13)
    sFields:=conv_curr
([Properties]usCost)+Char(13)+[Properties]rentalPeriod+
Char(13)

sFields:=sFields+Char(13)+String([Properties]rooms;"##0")+
Char(13)+String([Properties]bedrooms;"##0")+Char(13)
    sFields:=sFields+String([Properties]bathrooms;"#0.0")+
Char(13)+Char(13)+String([Properties]intArea;"###,##0")+"
sq. ft."+Char(13)
```

```
sFields:=sFields+String([Properties]lotSize;"###,##0.0")+"

acres"+Char(13)

If ([Properties]views=True)

sFields:=sFields+"Yes"

Else sFields:=sFields+"No"

End if

End case sContact:=[Properties]contact+Char(13)+

[Properties]contactPhone sComments:=""

Procedure CHECK_BUTTONS

` Check to enable/disable buttons in single property
    layout

If (Selected record number([Properties])=1)

DISABLE BUTTON(bPrev)

Else

ENABLE BUTTON(bPrev)

End if

If (Selected record number([Properties])=Records in selection([Properties]))

DISABLE BUTTON(bNext)

Else

ENABLE BUTTON(bNext)

End if

Layout Procedure SINGLE_PROP

` Set up pictures for this property
```

Case of

: (Before)

SETUP_SINGLE

CHECK_BUTTONS

End case

We claim:

1. A computer implemented system for storing textual data and compressed image data, comprising:
 a processor;
 memory;
 storage means;
 means for prompting a user to enter into the system at least one image, and textual and numerical information for at least one item;
 means for receiving said at least one image as uncompressed image data;
 means for receiving said textual and numerical information as textual data;
 means for storing in the memory, for each item, the uncompressed image data together with the textual data as an omnibus record containing image fields and textual fields, wherein the uncompressed image data for each image is contained in a separate image field, and the textual data is contained in separate textual fields, at least one of which is searchable according to one of a plurality of predetermined search criteria;
 means for compressing the uncompressed image data contained in each image field of the omnibus record thereby creating a compressed data representation of the uncompressed image data contained in the image field and substituting the compressed data representation for the uncompressed image data;
 means for creating and storing in one of the textual fields of the omnibus record a sequence number; and
 means for writing the image fields of the omnibus record into an image file, in the storage means, identified by the sequence number contained in the textual data and separate from the textual fields of the omnibus record that are written into at least one textual file.

2. A computer implemented system as in claim 1, wherein the storage means has one textual file, and wherein all of the textual fields of the omnibus record are written into the textual file as a textual record.

3. A computer implemented system as in claim 1, wherein the storage means has a searchable textual file and a non-searchable free form textual file, and wherein said each searchable textual field of the omnibus record, including the textual field containing the sequence number, is written to the searchable textual file as a searchable textual record, and said each non-searchable textual field of the omnibus record is written to the free form textual file as a non-searchable free form textual record identified by the sequence number.

4. A computer implemented system as in claim 1, wherein the compressed representation is created through use of a storage database engine which manipulates the omnibus record, a compression driver and an external access routine; and wherein the storage database engine passes to the external access routine a memory location pointer which references the uncompressed image data contained in one of the image fields of the omnibus record; the compression driver then creates the compressed representation; and thereafter the external access routine changes the memory location pointer so that the memory location pointer references the compressed representation rather than the uncompressed image data, clears the uncompressed image data from the memory and passes the memory location pointer back to the storage database engine.

5. A computer implemented system as in claim 1, further comprising an archive means containing an archive medium, wherein the archive means is utilized to create a copy of the image file and each textual file stored in the storage means.

6. A computer implemented system as in claim 5, further comprising an archival duplication means for duplication of the data stored in the archive medium.

7. A computer implemented system as in claim 1, further comprising a means for editing the image data.

8. A computer implemented system as in claim 1, which employs a stand alone digital microcomputer.

9. A computer implemented system for retrieving textual data and compressed image data, comprising:
 a processor;
 memory;
 storage means including at least one textual file having textual records comprising textual data in searchable textual fields, and an image file having image records comprising compressed image data in image fields, wherein one textual field for each textual record having searchable textual fields contains a sequence number referencing one of the image records;
 means for searching the searchable textual fields of the textual records to determine which textual records having searchable textual fields satisfy a user search query embodying a set of particular values or ranges for at least one predetermined search criterion;
 means for creating and storing in the memory a search criteria satisfaction table identifying the textual records containing the searchable textual fields satisfying the search query;
 means for loading into the memory the textual fields containing the sequence numbers for the textual records identified in the search criteria satisfaction table, and at least one of the image fields contained in at least one of the image records referenced by the sequence numbers; and
 display means for displaying at least one pictorial representation generated from the compressed image data loaded into the memory, wherein the compressed image data is decompressed as the pictorial representation of the image data is displayed.

10. A computer implemented system as in claim 9, further comprising means for loading into the memory textual fields from the textual records identified in the table, wherein the display means displays textual information generated from the textual data loaded into the memory.

11. A computer implemented system as in claims 9 or 10, wherein the display means displays multiple pictorial representations.

12. A computer implemented system as in claim 9, wherein the storage means contains one textual file which further comprises non-searchable textual fields in the textual records.

13. A computer implemented system as in claim 9, wherein the storage means further includes a free form textual file having free form textual records, each of which comprises at least one non-searchable field and is referenced by one of the textual records containing searchable textual fields.

14. A computer implemented system as in claim 13, further comprising means for loading into the memory at least one of the non-searchable textual fields from at least one of the free form textual records referenced by the textual records identified in the table, so that the display means can display the textual information generated therefrom.

15. A computer implemented system as in claim 9, wherein the search query is created through the use of a pointing device and a graphical user interface.

16. A computer implemented system as in claim 14, wherein the pointing device is a tough screen.

17. A computer implemented system as in claim 9, wherein the pictorial representation of the compressed image data is displayed on the display means through use of an operating system, a retrieval database engine and a decompression driver; and wherein the retrieval database engine calls the operating system to display on the display means the pictorial representation of the image data, said pictorial representation being decompressed by the decompression driver as the pictorial representation is displayed.

18. A computer implemented system as in claim 9, which employs a stand alone digital microcomputer.

19. A computer implemented system for storing and retrieving textual data and compressed image data, comprising:

a processor;
memory;
storage means;
storage mode means comprising;
    means for prompting a user to enter into the system said at least one image, and textual information, for at least one item;
    means for receiving at least one image so as to create uncompressed image data;
    means for receiving textual and numerical information so as to create textual data;
    means for storing in the memory, for each item, the uncompressed image data together with the textual data as an omnibus record containing image fields and textual fields, wherein the uncompressed image data for each image is contained in a separate image field, and the textual data is contained in separate textual fields, at least one of which is searchable according to one of a plurality of search criteria;
    means for creating a compressed representation of the uncompressed image data contained in each image field of the omnibus record and substituting the compressed representation for the uncompressed image data contained in the image field;
    means for creating and storing in one of the textual fields of the omnibus record a sequence number; and
    means for writing to the storage means the textual fields of the omnibus record separately from the image fields of the omnibus record, so that the textual fields of the omnibus record are written into at least one textual file as a textual record having searchable textual fields, including the textual field containing the sequence number, and the image fields of the omnibus record are written into an image file as an image record identified by the sequence number contained in the textual record;
a retrieval mode means comprising;
    means for searching the searchable textual fields of textual records contained in the storage means to determine which textual records having searchable textual fields satisfy a user search query embodying a set of particular values or ranges for at least one of the predetermined search criteria;
    means for creating and storing in the memory a table identifying the textual records containing searchable textual fields satisfying the search query;
    means for loading into the memory textual fields from the textual records identified in the table, including the textual fields containing the sequence numbers, and at least one of the image fields contained in at least one of the image records referenced by the sequence numbers; and
    a display means for displaying textual information and pictorial representations generated from the data loaded into the memory, wherein the compressed image data is decompressed as a pictorial representation of the image data is displayed; and
means for selecting the storage mode means and the retrieval mode means.

20. A computer implemented method for storing textual data and compressed image data, comprising the steps of:

inputting at least one image for at least one item and creating uncompressed image data for the image;

storing the uncompressed image data for the image in an image field in an omnibus record;

creating a compressed representation of the image data contained in the image field, and thereafter replacing the uncompressed image data in the image field with a compressed representation of the uncompressed image data;

receiving textual information for the item and creating textual data which is stored in separate textual fields in the omnibus record, at least one of the textual fields pertains to one of a plurality of search criteria;

creating and storing in one of the textual fields of the omnibus record a sequence number; and writing the image field of the omnibus record separately from the textual fields of the omnibus record to a storage devices, wherein the image field of the omnibus record is written into an image file as an image record which is identified by the sequence number contained in the textual data; and wherein the textual fields of the omnibus record are written into at least one textual file.

21. A method as in claim 20, wherein multiple images for an item are received and uncompressed image data is created for each image, a compressed representation of the uncompressed image data for each image is created and stored in a separate image field in the omnibus record, and all of the image fields for the omnibus record are written separately from the textual fields of the omnibus record to the storage device as the image record.

22. A method as in claim 20, wherein the storage means has one textual file, and wherein all of the textual fields of the omnibus record are written into the textual file as a textual record.

23. A method as in claim 20, wherein the storage means has a searchable textual file in which the searchable textual fields of the omnibus record, including the textual field containing the sequence number, are written as a searchable textual record; and a non-searchable free form textual file in which the non-searchable textual fields of the omnibus record are written as a non-searchable free form textual record identified by the sequence number.

24. A method as in claim 20, wherein of the image data the compressed representation is created and replaces the uncompressed image data in the image field of the omnibus record through the following steps:
passing from a storage database engine to an external access routine a memory location pointer which references the uncompressed image data contained in one of the image fields of the omnibus record;
creating a compressed representation of the uncompressed image data by means of a compression driver;
changing the memory location pointer so that memory location pointer references the compressed representation rather than the uncompressed image data;
clearing the uncompressed image data from the memory; and
passing the memory location pointer back to the storage database engine.

25. A method as in claim 20, comprising the further step of copying the image file and each of the textual files stored on the storage means, to an archive medium contained on an archive device.

26. A method as in claim 25, comprising the further steps of:
creating a duplication master of the archive medium;
creating duplication replicas of the duplication master; and
distributing the duplication replicas for use in retrieving the data stored on the duplication replicas.

27. A method as in claim 20, comprising the futher step of editing the image data.

28. A computer implemented method for retrieving textual data and compressed image data, comprising the steps of:
creating a search query embodying particular values and ranges for at least one of a plurality of predetermined search criteria;
searching searchable textual fields of textual records located on a textual file in a storage means to find the textual records containing the searchable textual fields which satisfy the search query; wherein each textual record having searchable textual fields contains one textual field which contains a sequence number; and wherein the storage means includes a separate image file having image records which further contain image fields of compressed image data, each of the image records being identified according to one of the sequence numbers;
creating a table of the textual records having searchable textual fields satisfying the search query and storing the table in a memory of a computer system capable of communicating with the storage means;
retrieving into the memory textual fields containing the sequence number from textual records identified in the table, and at least one of the image fields of at least one of the image records referenced by the sequence numbers; and
displaying pictorial representations generated from the compressed image data loaded into the memory, wherein the compressed image data is decompressed as a pictorial representation is displayed.

29. A method as in claim 28, futher comprising the steps of retrieving into the memory textual fields from textual records identified in the table, displaying textual information generated from the textual data loaded into the memory.

30. A method as in claims 28 or 29, wherein pictorial representations are displayed.

31. A method as in claim 28, wherein the storage means contains a free form textual file having free form textual records, each of which comprises at least one non-searchable field and is referenced by one of the textual records containing searchable textual fields.

32. A method as in claim 31, comprising the further steps of loading into the memory at least one of the non-searchable textual fields from one of the free form textual records referenced by the textual records identified in the table, and displaying the textual information generated therefrom.

33. A method as in claim 28, wherein the search query is created through the use of a pointing device and a graphical user interface.

34. A method as in claim 33, wherein the pointing device is a touch screen.

35. A computer implemented method for storing and retrieving textual data and compressed image data, comprising the steps of:
(a) receiving an image for an item and creating uncompressed image data for the image;
(b) storing the uncompressed image data for the image in an image field in an omnibus record;
(c) creating a compressed representation of the image data contained in the image field, and thereafter replacing the uncompressed image data in the image field with a compressed representation of the uncompressed image data;
(d) repeating steps (a) through (c) until all of the images for an item have been received, and each is stored in a separate image field as a compressed representation of the uncompressed image data created from the image;
(e) receiving textual information for the item and creating textual data which is stored in separate textual fields in the omnibus record, at least one of the textual fields pertains to one of a plurality of search criteria and as such is searchable;

(f) creating and storing in one of the textual fields a sequence number; and (g) writing the image fields of the omnibus record separately from the textual fields of the omnibus record to a storage device; wherein the image fields of the omnibus record are written into an image file as an image record, which is identified by the sequence number contained in the textual data; and wherein the textual fields of the omnibus record are written into at least one textual file;

(h) repeating steps (a) through (g) until data from all of the items has been stored on the storage devices;

(i) creating a search query embodying particular values and ranges for at least one of a plurality of predetermined search criteria;

(j) searching the searchable textual fields of textual records located in the storage means to find the textual records containing searchable textual fields which satisfy the search query;

(k) creating a table of the textual records having searchable textual fields satisfying the search query and storing the table in a memory of a computer system capable of communicating with the storage means;

(l) retrieving into the memory the textual fields, including the textual fields containing the sequence numbers, from the textual records identified in the table, and at least one of the image fields of at least one of the image records referenced by the sequence numbers; and (m) displaying textual information and pictorial representations generated from the data loaded into the memory, wherein the compressed image data is decompressed as each pictorial representation is displayed.

* * * * *